US012808795B2

(12) United States Patent
Zhou et al.

(10) Patent No.: US 12,808,795 B2
(45) Date of Patent: Nov. 24, 2026

(54) PHASE AMPLIFICATION MICROSCOPY

(71) Applicant: The Chinese University of Hong Kong, Hong Kong (CN)

(72) Inventors: Renjie Zhou, Hong Kong (CN); Nansen Zhou, Hong Kong (CN)

(73) Assignee: The Chinese University of Hong Kong, Hong Kong (CN)

(*) Notice: Subject to any disclaimer, the term of this patent is extended or adjusted under 35 U.S.C. 154(b) by 92 days.

(21) Appl. No.: 18/807,202

(22) Filed: Aug. 16, 2024

(65) Prior Publication Data

US 2026/0049930 A1 Feb. 19, 2026

(51) Int. Cl.
*G01N 21/45* (2006.01)
*G01B 11/06* (2006.01)

(52) U.S. Cl.
CPC ......... *G01N 21/45* (2013.01); *G01B 11/0675* (2013.01)

(58) Field of Classification Search
CPC ............... G01N 21/45; G01N 21/3581; G01N 2201/12; G01N 2201/0612; G01B 11/0675
See application file for complete search history.

(56) References Cited

U.S. PATENT DOCUMENTS 9,110,006 B1* 8/2015 Hovde .................... G01J 3/433
11,209,314 B2* 12/2021 Fleisher ................ G01J 3/4338
2009/0279173 A1* 11/2009 Chui ...................... G02B 5/201 428/221
2010/0111136 A1* 5/2010 Huang .............. G01N 21/7703 374/161
2010/0315642 A1* 12/2010 Chow .................... G01N 21/39 356/432

(Continued)

FOREIGN PATENT DOCUMENTS

AU 2020101628 A4 9/2020
AU 2020101629 A4 9/2020

(Continued)

OTHER PUBLICATIONS

Haronian Dan "Micromachined Displacement Sensors and Actuators", Nov. 30, 2000, WO 0071981 A1. (Year: 2000).*

(Continued)

*Primary Examiner* — Sang H Nguyen
(74) *Attorney, Agent, or Firm* — SALIWANCHIK, LLOYD & EISENSCHENK

(57) ABSTRACT

A microscopic imaging method with sub-Ångström level measurement accuracy is provided. The method includes coupling a phase cavity with an interferometric imaging system to effectively amplify phase signals of a sample of interest; modeling resonance effects in the phase cavity; and optimizing parameters of the phase cavity, such as the materials of the phase cavity, lengths of each layer of the phase cavity, and illumination wavelength, to maximize amplification of phase signals of the sample of interest. The phase cavity is disposed on a sample side of the interferometric imaging system. The method may further include obtaining phase maps by the interferometric imaging systems based on laser illumination and performing a transfer-matrix based reversal model on the measured phase maps to reconstruct thickness mapping results. A measurement accuracy of 0.1 Å can be achieved for the interferometric imaging system.

14 Claims, 15 Drawing Sheets

(56) References Cited

U.S. PATENT DOCUMENTS

| | | | | |
|---|---|---|---|---|
| 2013/0330232 | A1* | 12/2013 | Pruessner | G01N 29/036 422/82.11 |
| 2016/0202180 | A1* | 7/2016 | Rakic | G01N 21/45 250/341.1 |
| 2018/0013016 | A1* | 1/2018 | Englund | H10F 77/407 |
| 2018/0286631 | A1* | 10/2018 | Axelrod | H01J 37/04 |
| 2021/0113090 | A1* | 4/2021 | Zhang | A61K 31/496 |
| 2022/0035052 | A1* | 2/2022 | Enger | A61B 6/4208 |
| 2022/0095927 | A1* | 3/2022 | Zhang | A61B 1/00096 |
| 2023/0098039 | A1* | 3/2023 | Zeng | H01S 3/08036 372/9 |

FOREIGN PATENT DOCUMENTS

| | | | |
|---|---|---|---|
| AU | 2020101630 | A4 | 9/2020 |
| CN | 110584570 | A | 12/2019 |
| CN | 111122508 | A | 5/2020 |

OTHER PUBLICATIONS

International Search Report and Written Opinion dated Dec. 3, 2025 in International Application No. PCT/CN2025/115380.

* cited by examiner

PHASE AMPLIFICATION MICROSCOPY

BACKGROUND OF THE INVENTION

In recent years, twistronics has emerged as a novel approach for tuning energy gaps in two-dimensional (2D) layered materials by twisting the relative angle between successive layers[1-3]. Consequently, the electronic properties of 2D layered materials can be customized, leading to the creation of electronic and photonic devices based on these novel atomic materials[4-10], promising to revolutionize information processing beyond complementary metal-oxide semiconductor (CMOS) scaling limits[11].

Large-scale fabrication of atomic devices necessitates the advancement of atomic manufacturing. Since the Moore era, improvements in device yield have always been accompanied by advances in metrology as transistor size scales down. Scanning electron microscopy (SEM) and atomic force microscopy (AFM) have been widely used for characterizing device structures[12]. Owing to their non-contact, non-destructive, and high-throughput advantages, optical metrology methods such as bright-field imaging and scatterometry have been developed for in-line metrology and critical dimensional measurements.

To investigate the twist-angle-dependent interlayer coupling, spectroscopic techniques such as Raman microscopy[13] and spectroscopic ellipsometry[14] have been employed as optical characterization methods. However, these methods are limited by the required measurement time over a wide-field area, hindering their potential use in large-scale manufacturing. On the other hand, the atomic-scale interlayer spacing varies at the subatomic scale with the change of twisting angles. Current metrology tools lack the accuracy and throughput needed to detect such weak signals effectively. Therefore, there is a significant metrology gap that must be addressed for accelerating the development of beyond-CMOS technologies.

As a highly sensitive detection method, laser interferometry has recently made remarkable progress in detecting extremely weak signals, exemplified by the detection of cosmic gravitational waves through the Laser Interferometer Gravitational-wave Observatory (LIGO)[15]. With the advancement of laser pulse durations from femtosecond to attosecond durations, attosecond pulsed laser has enabled the investigation of the electron dynamics in complex molecules, and holds promise for ultrafast imaging of electron motion within materials[16]. To achieve high-throughput metrology, light microscopy provides a wide-field mapping solution but faces challenges of low visibility when imaging weak-signaled samples. The phase-contrast concept introduced by Zernike in light microscopy can enhance image contrast, allowing highly sensitive imaging of phase objects[17, 18]. The qualitative limitations of this initial approach further spurred the integration of laser interferometry and light microscopy, leading to the development of quantitative phase microscopy (QPM)[19-23].

Recent advances in high-sensitivity QPM have enabled geometric thickness measurement of atomic layers[24], inspection of neuronal deformation dynamics[25], and single protein mass measurements[26]. However, measurement accuracy for inspecting subatomic features remains limited, as weak phase signals from these features are often overwhelmed by spatial noise. Various strategies, including illumination coherence modulation[27-29] and averaging processing (e.g., frame summing and spatiotemporal filtering), have been proposed to improve sensitivity by suppressing noise. Despite their unique capabilities, these efforts cannot meet the need to inspect extremely weak signals from subatomic features due to the inherent barrier of the photon shot noise limit.

BRIEF SUMMARY OF THE INVENTION

There is a need in the art for the invention of phase amplification microscopy.

According to an embodiment of the subject invention, a microscopic imaging method with sub-Ångström level measurement accuracy is provided. The method comprises coupling a phase cavity with an interferometric imaging system to effectively amplify phase signals of a sample of interest; modeling resonance effects in the phase cavity; and optimizing parameters of the phase cavity to maximize amplification of phase signals of the sample of interest, while suppressing noises. The phase cavity is disposed on a sample side of the interferometric imaging system. Moreover, the phase cavity is formed by two cavity ends and a cavity body formed of a uniformly fabricated transparent film. Further, the optimizing parameters of the phase cavity comprises optimizing the materials of the phase cavity, lengths of each layer of the phase cavity, and illumination wavelength. The optimizing parameters of the phase cavity comprises defining a phase gain G-factor as an evaluation parameter of phase amplification. The microscopic imaging method may further comprise obtaining phase maps by the interferometric imaging systems based on laser illumination. In addition, the microscopic imaging method may further comprise performing a transfer-matrix-based reversal model on the measured phase maps to reconstruct thickness mapping results. Further, the microscopic imaging method may further comprise increasing spatial resolutions of the interferometric imaging system by providing synthetic aperture illumination, angle-scanning illumination, or short wavelength illumination. The short wavelength may be extreme ultraviolet wavelength. Moreover, the phase cavity may be formed of silicon dioxide ($SiO_2$), silicon nitride ($Si_3N_4$), or is formed by stacking a silicon dioxide ($SiO_2$) material and a silicon nitride ($Si_3N_4$) material. A measurement accuracy of 0.1 Å can be achieved for the interferometric imaging system.

BRIEF DESCRIPTION OF THE DRAWINGS

FIGS. 1A-1D are schematic representations of Phase Amplification Microscopy (Phi-AMP), wherein FIG. 1A shows the setup of the Phi-AMP; FIG. 1B shows that Phi-AMP is built on an epi-mode high-sensitivity interferometric imaging system, the phase cavity using resonance effect is designed and disposed on the sample side of the imaging system to amplify the weak phase signals overwhelmed by the noise by the phase gain G, meanwhile, the phase noise is maintained at the same level, so previously undetectable weak signals can be clearly mapped, FIG. 1C shows a thickness reversal model that precisely models the light propagation in the system for obtaining a geometric thickness map, FIG. 1D shows the theoretical estimation of subatomic-scale interlayer spacing difference attributed by electronic coupling in bilayer graphene (BLG) with different twisting angles by the density functional theory (DFT) calculations, according to an embodiment of the subject invention.

FIGS. 2A-2G show simulation results and experimental verification of phase gain and measurement accuracy validation, wherein FIG. 2A shows simulation results demonstrating the relationship between phase gain G and wavelength $\lambda_0$ and cavity length $H_2$, where the periodic relation between G and cavity length $H_2$ at 532 nm wavelength is plotted at the top, FIG. 2B shows simulation results and measured phase values, CNR analysis of 500 phase maps of the monolayer graphene sample at 5 cavity lengths $H_2$, including 0.262 μm, 0.275 μm, 0.285 μm, 0.305 μm, and 0.322 μm, with a scale bar of 5 μm, FIG. 2C shows a thickness reversal model for a 3-layer specimen, FIG. 2D shows comparison of the geometric thickness fluctuation maps of the sample-free region with and without cavity, FIG. 2E shows profiles along the blue and red dotted lines in FIG. 2D, FIG. 2F shows zoomed-in view of the local geometric thickness fluctuation map in the presence of cavity, FIG. 2G shows the histogram of the geometric thickness fluctuation map in FIG. 2D, illustrating the measurement accuracy of both cases, according to an embodiment of the subject invention.

FIGS. 3A-3J show metrology performance validation of the Phi-AMP, wherein FIG. 3A shows designed patterns made by monolayer graphene for e-beam lithography, FIG. 3B shows a geometric thickness map of the fabricated CUHK pattern by Phi-AMP, FIG. 3C shows a histogram analysis of FIG. 3B, FIG. 3D shows a geometric thickness map of the fabricated CUHK pattern by AFM, FIG. 3E shows the comparison of Phi-AMP and AFM measurement profiles along the white dotted line in FIG. 3B, FIGS. 3F and 3G show geometric thickness maps of the 'K' word within the white box in FIG. 3B measured by Phi-AMP and AFM, respectively, FIG. 3H shows a histogram comparison of FIG. 3F and FIG. 3G, FIG. 3I shows a geometric thickness map of the designed resolution target, FIG. 3J shows the line profile along the white dotted line in FIG. 3I, according to an embodiment of the subject invention.

FIG. 4A shows the synthesis and transfer processes of BLG samples, FIG. 4B shows stacking orders of AB-BLG and 30°-tBLG, and corresponding SAED patterns, FIG. 4C shows Raman spectra and Lorentz fitting of the 2D bands of MLG, AB-BLG, and 30°-tBLG, respectively, FIG. 4D shows DFT calculations results for BLG with different twisting angles, FIG. 4E shows retrieved geometrical thickness maps from Phi-AMP of AB-BLG and 30°-tBLG, respectively, FIG. 4F shows histograms of the geometrical thickness maps of AB-BLG and 30°-tBLG in FIG. 4E, respectively, FIG. 4G shows an independent-samples t-test demonstrating a 0.33 Å interlayer spacing difference between bilayer graphene samples with different θ ($P<0.01$), wherein the results are comparable with density functional theory (DFT) calculations as labeled with stars, according to an embodiment of the subject invention.

FIGS. 5A-5C show the generalization of phase gain mechanism by optimizing the cavity design, such as a $Si_3N_4/SiO_2$ cavity, wherein FIG. 5A shows a schematic representation of a 4-layer specimen with a two-layer cavity, FIG. 5B shows simulation results of the relationship between phase gain G and cavity lengths of two layers $d_1$ and $d_2$ at 532 nm wavelength, wherein the relation between G and $d_2$ at $d_1$=0.2 μm is plotted, the phase gain may reach around 1000, according to an embodiment of the subject invention. The simulation results demonstrate the possibility of higher phase amplification with a multi-layer cavity design as shown in FIG. 5C.

DETAILED DISCLOSURE OF THE INVENTION

Figure 1A:
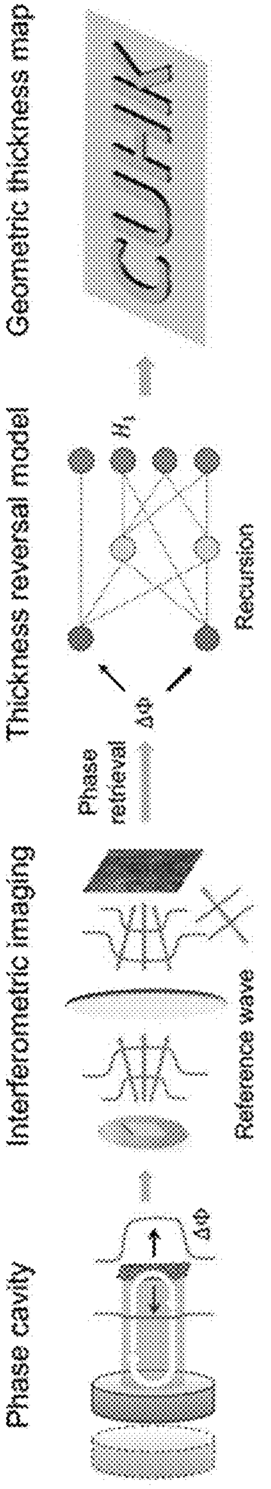

The embodiments of subject invention pertain to microscopy-based metrology methods. In particular, the invention pertains to a microscopic imaging method with sub-Ångström level measurement accuracy that can be used to reveal electron coupling between atomic layers.

The terminology used herein is for the purpose of describing particular embodiments only and is not intended to be limiting to the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

As an emerging platform for tailoring the energy bandgap of atomic materials, twistronics plays a pivotal role in next-generation electronic devices. Fabrication of these atomic devices gives rise to an imminent demand for sub-atomic-scale metrology to improve the device yield. However, existing metrology tools cannot meet the demand due to insufficient precision, accuracy, and throughput.

According to embodiments of the subject invention, Phase Amplification Microscopy (Phi-AMP) is provided to push the measurement accuracy limit of wide-field light microscopy to the unprecedented subatomic level. Leveraging the high-sensitivity nature of laser interferometry and exploring an optimized phase cavity, the Phi-AMP can significantly amplify weak phase signals overwhelmed by noises. The working principles of the phase cavity are also investigated, and a 30 times phase amplification is demonstrated in a compact system by fabricating the phase cavity compatible with silicon platforms for atomic manufacturing, with an imaging time of less than 2 milliseconds. By developing a reversal model that simulates light propagation in the system, the geometric thickness map of graphene with 0.1 Å accuracy within a single frame is precisely obtained. Benefitting from the deep sub-Å accuracy, the quantification of the interlayer spacing difference in twisted bilayer graphene samples is achieved, which is a measurement of the electronic coupling strength that varies with twisting angles. Moreover, the experimental measurement of the sub-Å interlayer spacing difference with Phi-AMP could lead to establishing a new metrology standard for the sub-Ångström unit using twisted bilayer graphene as a potential new reference material. Furthermore, the phase cavity can be generalized for much higher phase amplification by using a multi-layer cavity design. Consequently, the Phi-AMP method is promising in bringing discoveries in twistronics and improving wafer-scale atomic fabrication.

The Phase Amplification Microscopy (Phi-AMP) of the subject invention offers a robust solution to the challenges of measurement precision, accuracy, and throughput in atomic metrology. By investigating the working principles of phase cavities, a 30-fold phase amplification is demonstrated through the measurement of monolayer graphene on a $SiO_2$-based phase cavity, wherein $SiO_2$ is commonly used as a dielectric layer in atomic devices.

By incorporating the optimized phase cavity into a highly sensitive laser interferometric imaging system, the selectively amplified weak phase map generated from subatomic structures can be retrieved with high visibility and stability. To obtain the geometric thickness map from the amplified phase map, a reversal model is developed by precisely simulating the light propagation and experimentally characterized the thickness measurement accuracy to be about 0.1 Å over a wide field within a single frame, with an imaging time of less than 2 milliseconds. Such a rapid mapping indicates that the throughput of Phi-AMP is at least 500 times higher than that of the existing metrology tools.

To evaluate the measurement capabilities of embodiments of the Phi-AMP of the subject invention, the geometric thickness map of patterned atomic structures created using electron beam lithography (EBL) and quantified the diffraction-limited lateral resolution is obtained. Leveraging the deep sub-Å accuracy, the interlayer spacings of AB-stacked BLG (AB-BLG) and 30°-twisted BLG (30°-tBLG) are mapped, distinguishing a difference of approximately 0.3 Å.

Remarkably, the accurate measurement of the sub-Å interlayer spacing difference with Phi-AMP positions twisted bilayer graphene as a potential new reference material for the metrology standard of the sub-Ångström unit. The generalization of phase cavity with much higher phase amplification is also discussed, which could potentially achieve sub-picometer level accuracy. The Phi-AMP is expected to advance the development of both twistronics and next-generation semiconductor manufacturing, as well as contribute to neuroscience research.

In one embodiment, the Phi-AMP is based on an epi-mode laser interferometric imaging system to minimize the impact of environmental noise, which is essential for achieving high measurement accuracy. To circumvent the constraints on measurement accuracy caused by phase noise, an optical phase cavity is designed on the sample side of the imaging system. The phase cavity is naturally formed by two opposing ends generated by the required silicon (Si) substrate for imaging and the sample itself, with the phase cavity body composed of uniformly fabricated transparent films. By optimizing the cavity design, the resonance effect in the phase cavity can maximize the screening and amplification of the phase signals of the sample of interest, while suppressing others due to interference. This ensures that the amplified phase signals from the weak-signal sample are not obscured by noise, thereby enhancing visibility under phase imaging. Unlike a cavity designed for intensity signal amplification, the sample information encoded in the phase signal can be quantitatively reconstructed according to their physical relationship with Phi-AMP. The reflected field $E_r$ can be simplified to an expression of the equivalent reflection coefficients $r_{0,N}$ of the equivalent reflection interface by using the recurrence relationship between the defined effective complex refractive index values. Then, the reflective phase values in the presence of the phase cavity $\Delta\Phi$ can be retrieved from $E_r$. The retrieved amplified phase can be expressed as a transformation function of the sample thickness $H_1$, i.e., $\Delta\Phi=\mathcal{T}\{H_1\}$. Therefore, $\mathcal{T}$ a geometric thickness reversal model can be developed to accurately retrieve the thickness map of sample of interest from the amplified phase map through $H_1=\mathcal{T}\{\Delta\Phi\}$. Therefore, a geometric thickness reversal model can be developed to accurately retrieve the thickness map of the sample interest from the amplified phase map through $H_1=\mathcal{T}^{-1}\{\Delta\Phi\}$. Benefiting from the phase gain, high-sensitivity interferometric imaging system, and precise thickness reversal model, Phi-AMP can distinguish the subatomic-scale interlayer spacing difference between adjacent layers of BLG at different twisting angles The measured result matches the theoretical estimation derived from density functional theory (DFT) calculations.

Figure 1B:
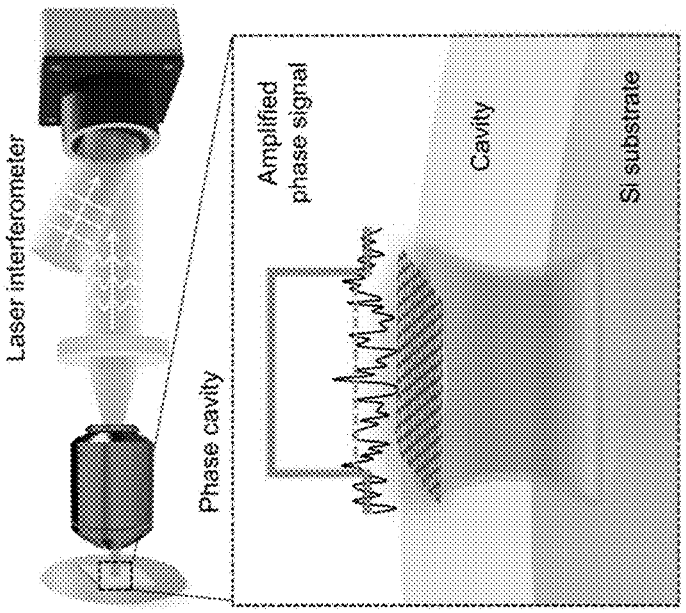
Figure 1C:
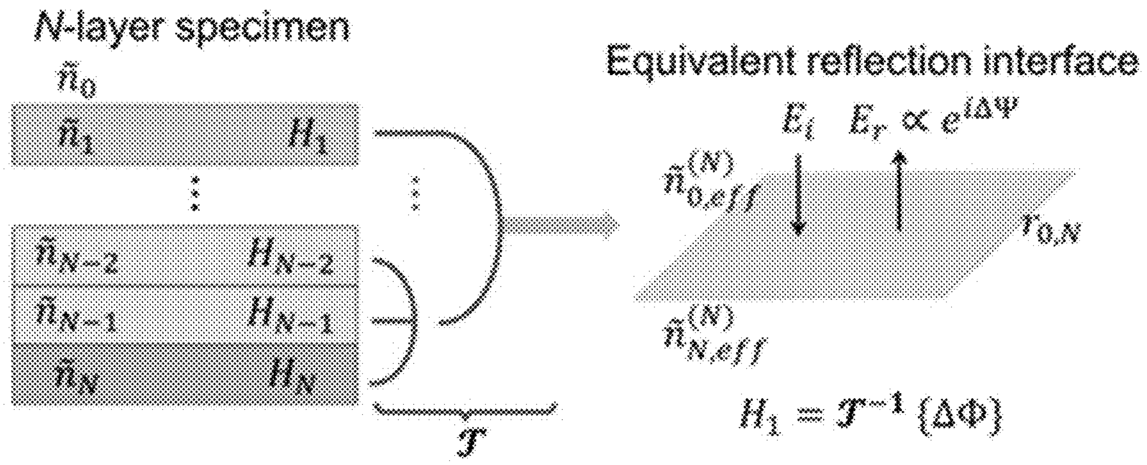
Figure 1D:
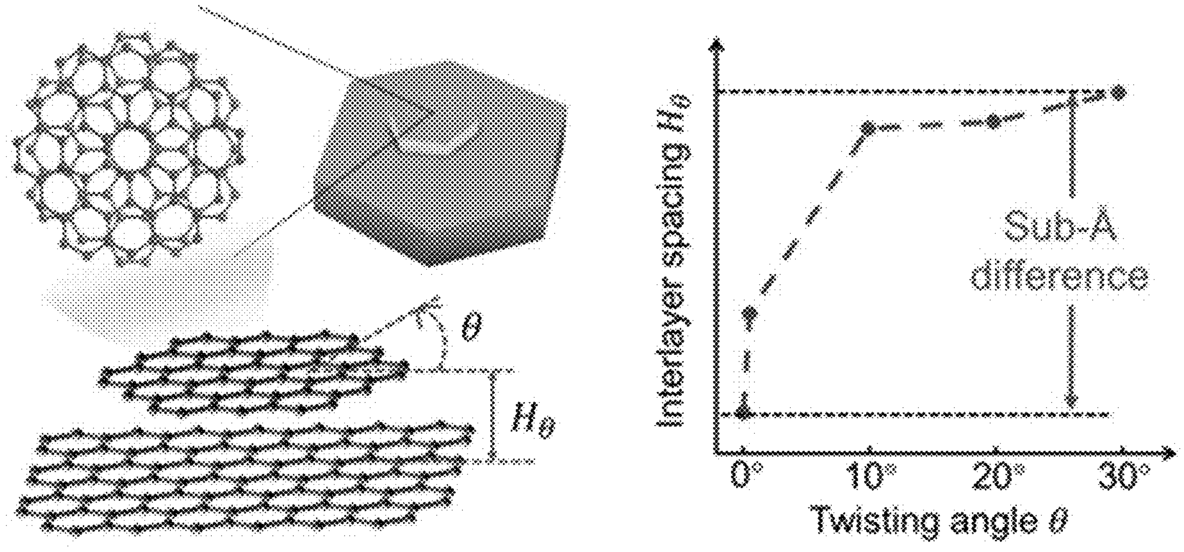

Referring to FIG. 1A, the setup of the Phi-AMP method is shown. FIG. 1B demonstrates that Phi-AMP is built on an epi-mode high-sensitivity interferometric imaging system, the phase cavity using resonance effect is devised and introduced on the sample side of the imaging system to amplify the weak phase signals overwhelmed by noise by the phase gain G. Meanwhile, the phase noise is maintained at the same level, such that previously undetectable weak signals can be clearly mapped. In FIG. 1C, a thickness reversal model that precisely models the light propagation in the system for obtaining a geometric thickness map is illustrated. FIG. 1D shows the theoretical estimation of subatomic-scale interlayer spacing difference attributed by electronic coupling in BLG with different twisting angles by DFT calculations.

Figure 2A:
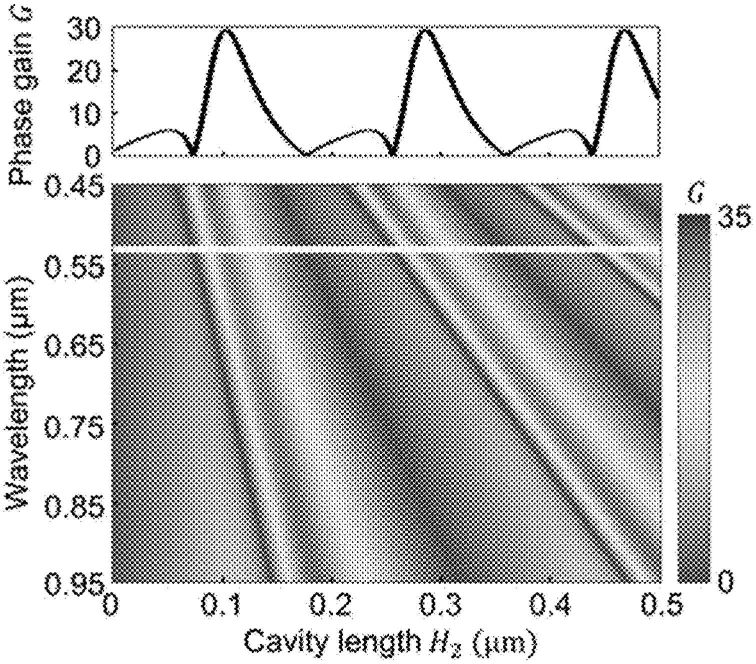
Figure 2B:
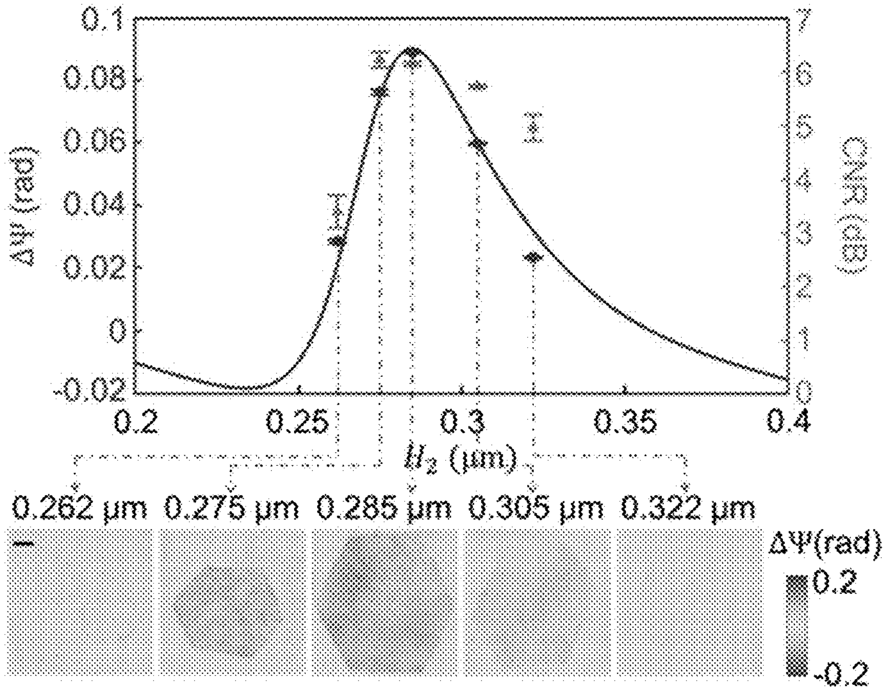
Figure 2C:
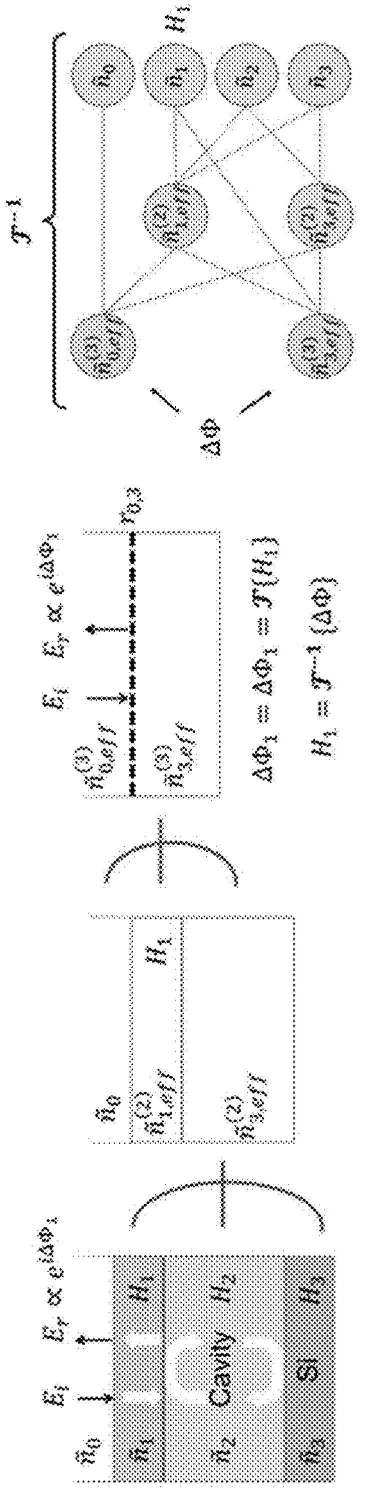
Figure 2D:
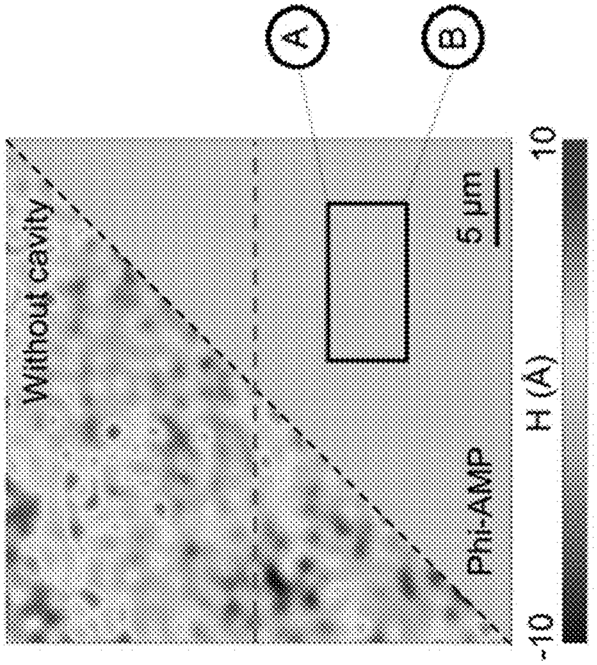
Figure 2E:
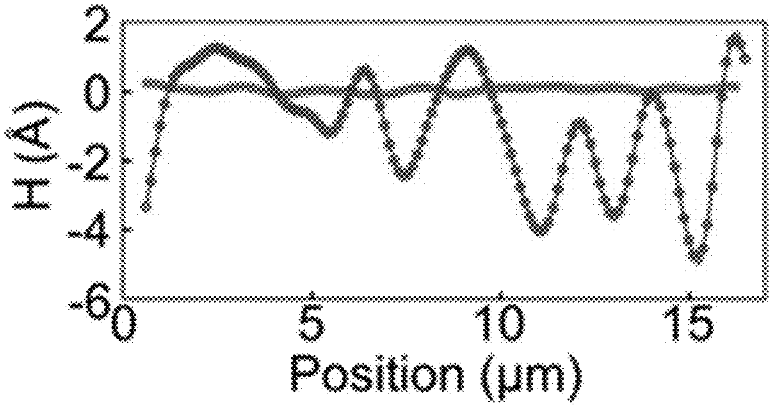
Figure 2F:
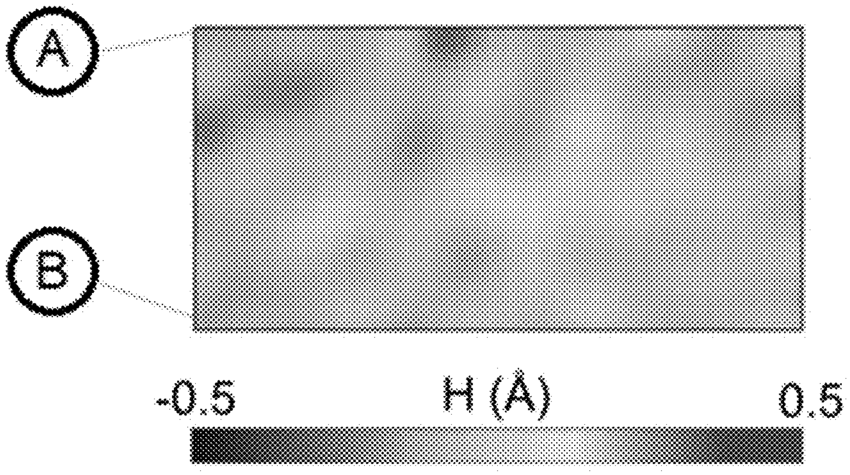
Figure 2G:
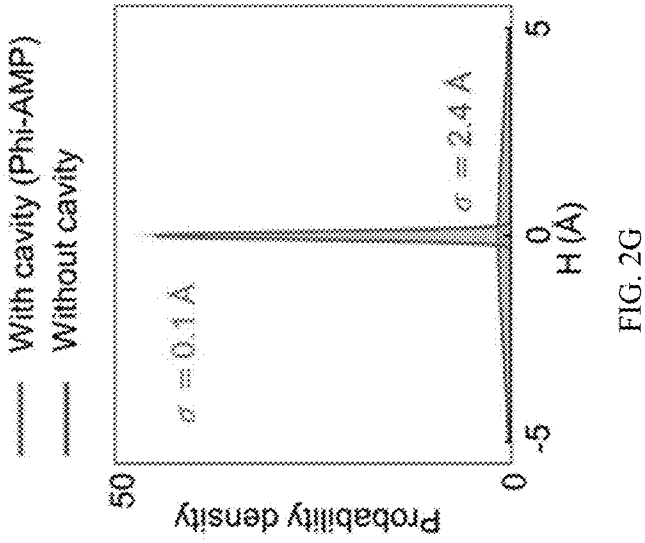

FIGS. 2A-2G show simulation results and experimental verification of phase gain, and measurement accuracy validation. In particular, FIG. 2A shows simulation results demonstrating the relationship between phase gain G and wavelength $\lambda_0$ and cavity length $H_2$, where the periodic relation between G and cavity length $H_2$ at 532 nm wavelength is plotted at the top. FIG. 2B shows simulation results and measured phase values, CNR analysis of 500 phase maps of the monolayer graphene sample at 5 cavity lengths $H_2$, including 0.262 μm, 0.275 μm, 0.285 μm, 0.305 μm, and 0.322 μm, with a scale bar of 5 μm. FIG. 2C illustrates a thickness reversal model for a 3-layer specimen. FIG. 2D provides comparison of the geometric thickness fluctuation maps of the sample-free region with and without a cavity. FIG. 2E shows profiles along the blue and red dotted lines in FIG. 2D. FIG. 2F is a zoomed-in view of the local geometric thickness fluctuation map in the presence of a cavity. In FIG. 2G, the histogram of the geometric thickness fluctuation map in FIG. 2D is shown, illustrating the measurement accuracy of both cases.

Figure 3A:
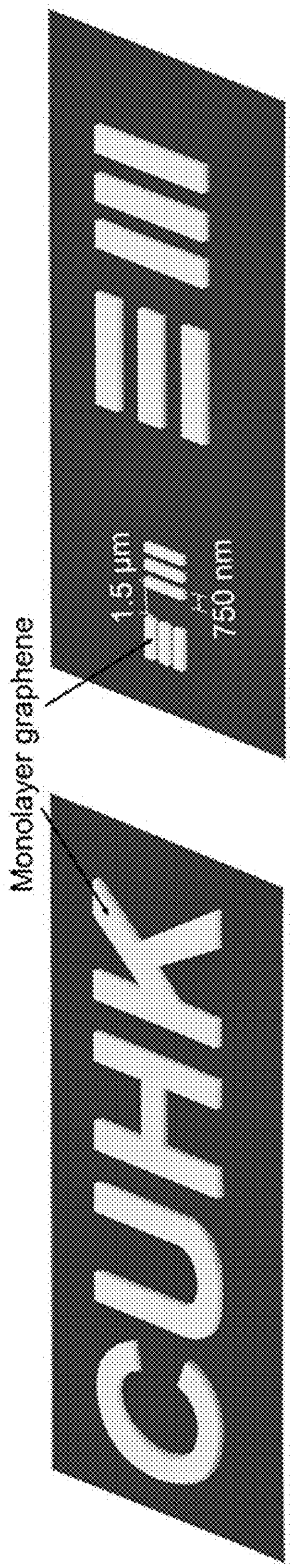
Figure 3B:
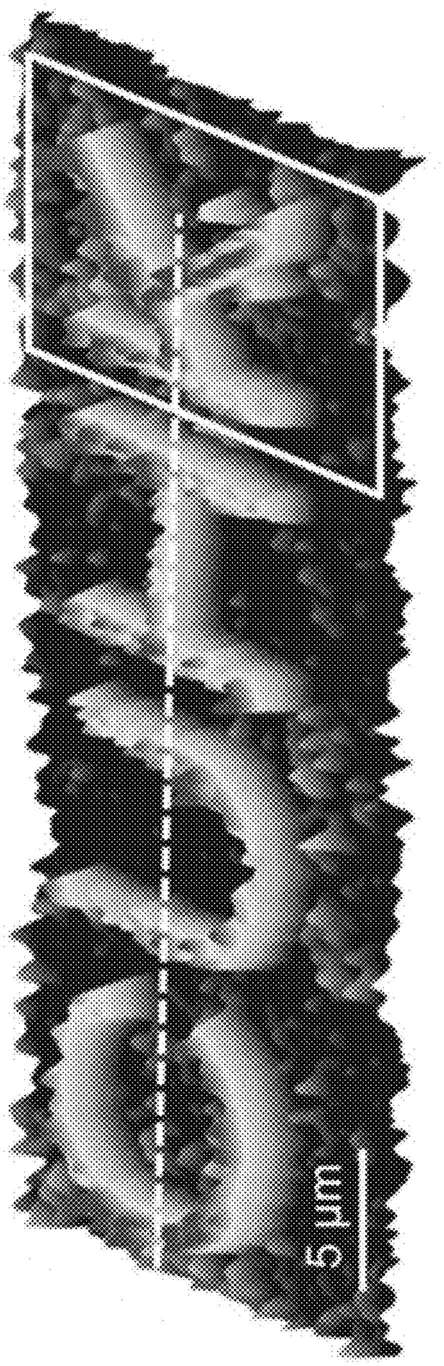
Figure 3C:
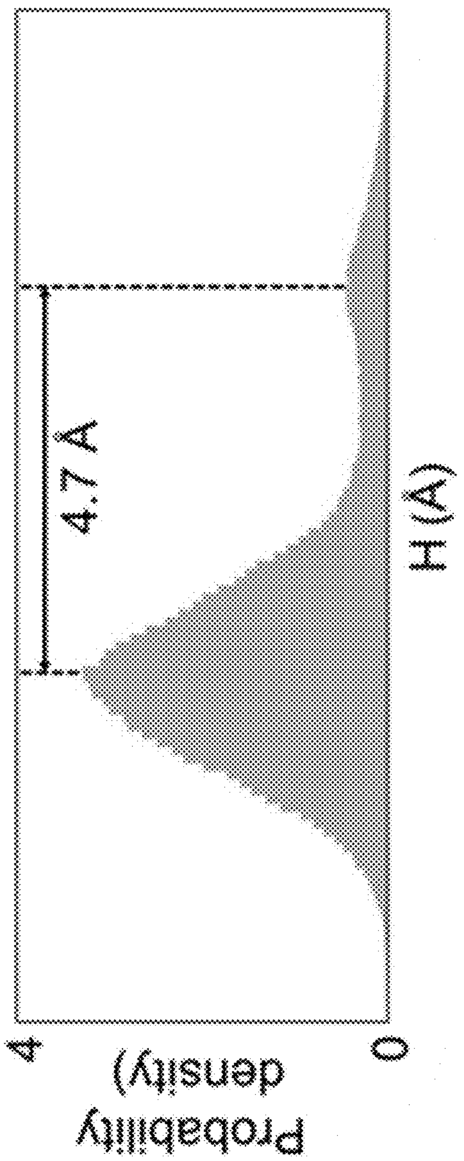
Figure 3D:
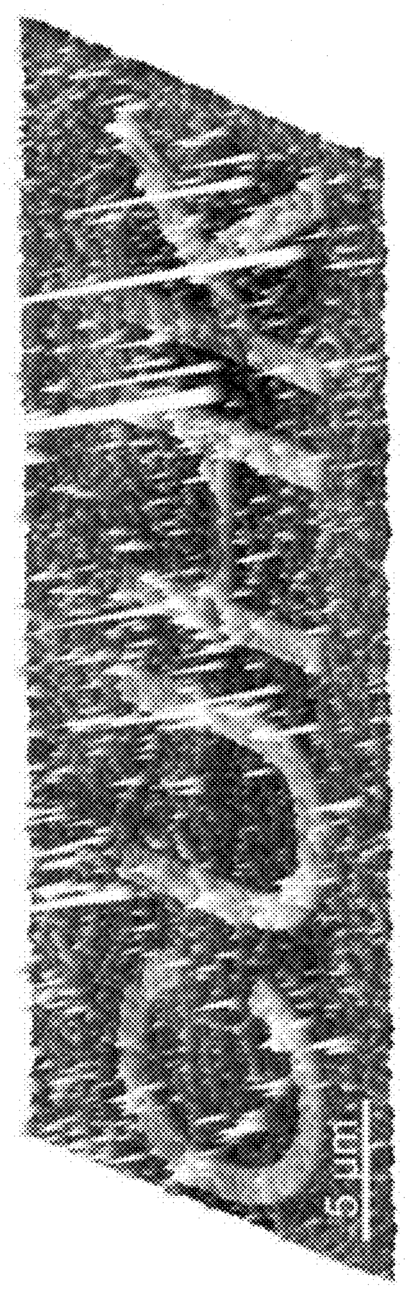
Figure 3E:
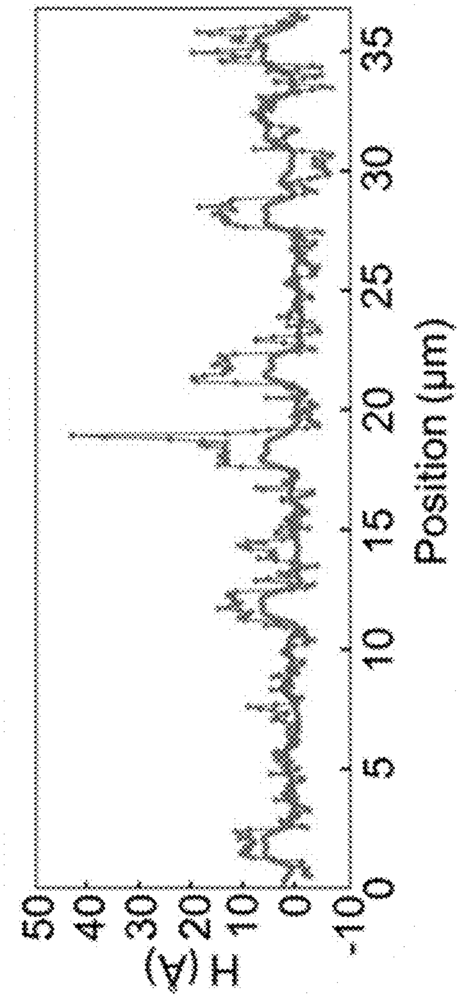
Figure 3F:
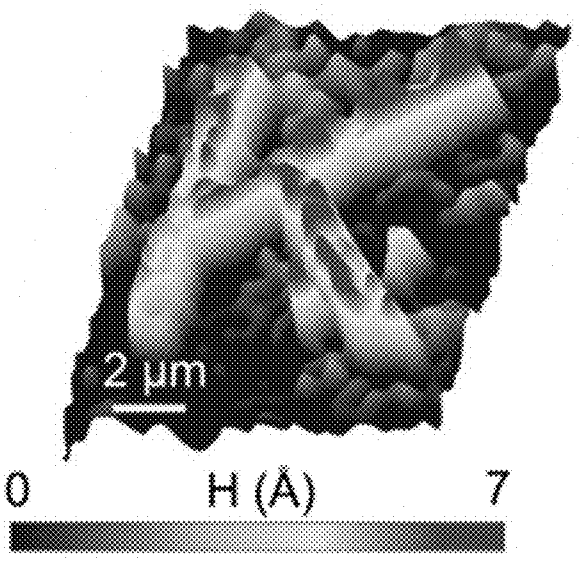
Figure 3G:
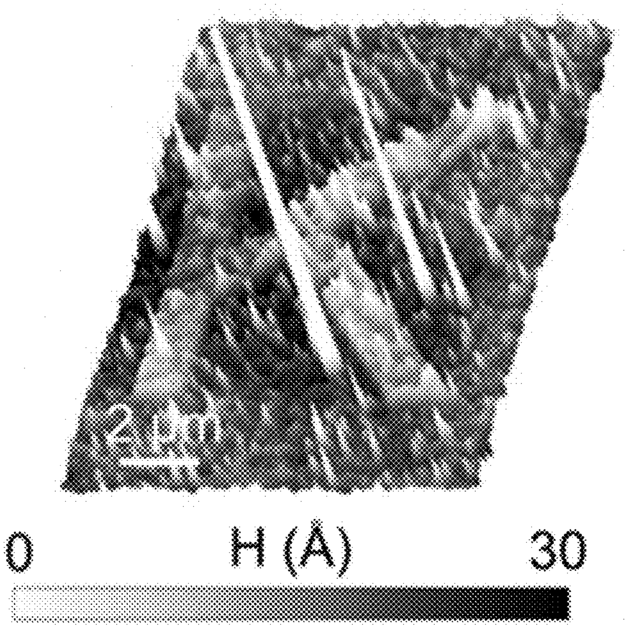
Figure 3H:
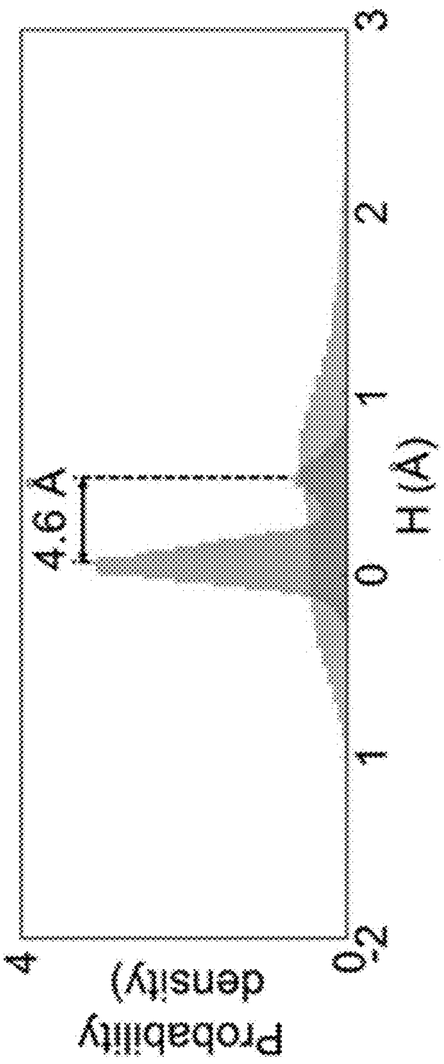
Figure 3I:
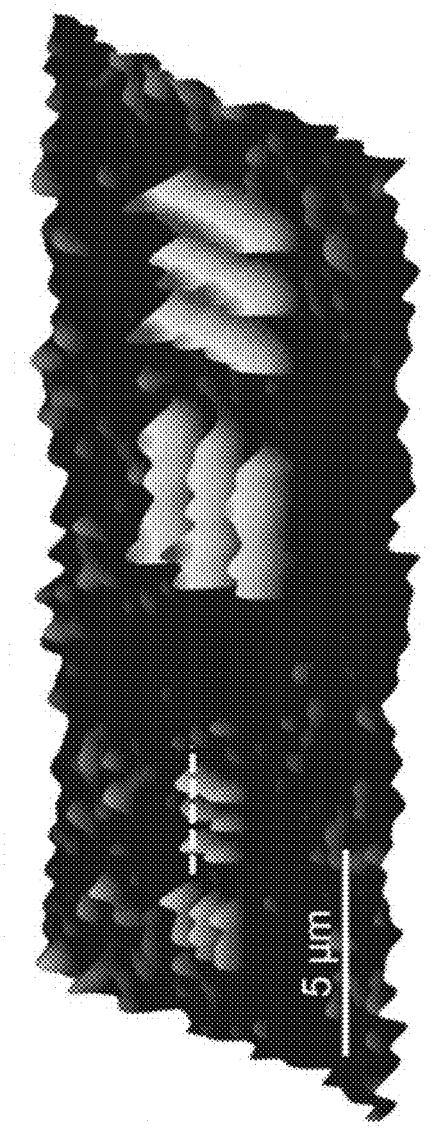
Figure 3J:
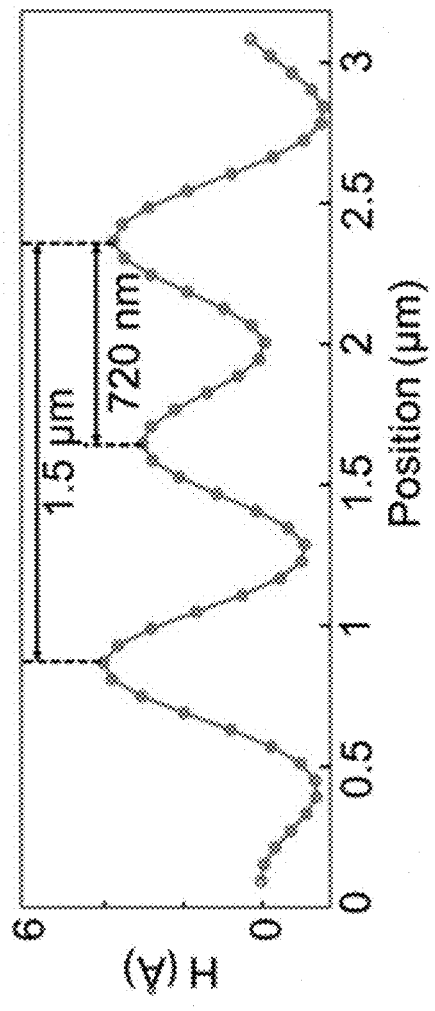

FIGS. 3A-3J illustrate metrology performance validation of Phi-AMP. In particular, FIG. 3A shows designed patterns made by monolayer graphene for e-beam lithography. FIG. 3B is a geometric thickness map of the fabricated CUHK pattern by Phi-AMP. FIG. 3C shows a histogram analysis of FIG. 3B. FIG. 3D shows a geometric thickness map of the fabricated CUHK pattern by AFM, FIG. 3E shows the comparison of Phi-AMP and AFM measurement profiles along the white dotted line in FIG. 3B. FIGS. 3F and 3G are geometric thickness maps of the 'K' word within the white box in FIG. 3B measured by Phi-AMP and AFM, respectively. FIG. 3H provides a histogram comparison of FIG. 3F and FIG. 3G. FIG. 3I is a geometric thickness map of the designed resolution target. FIG. 3J shows the line profile along the white dotted line in FIG. 3I.

Figure 4A:
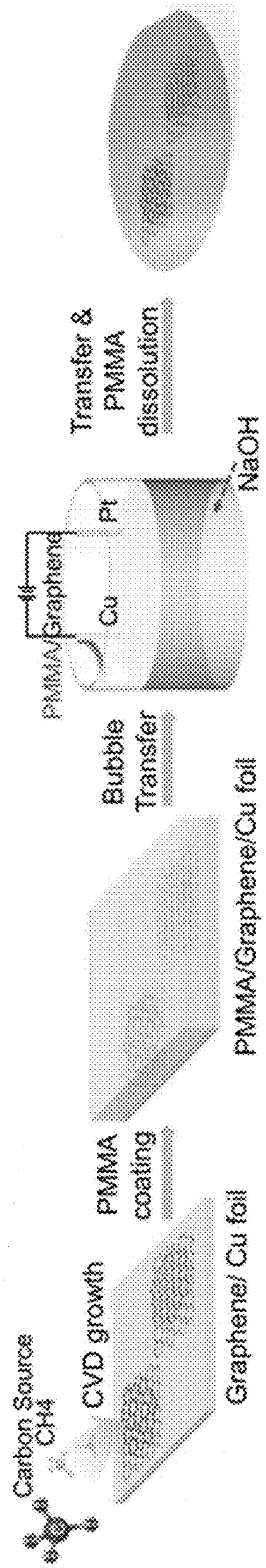
FIGS. 4A-4G show interlayer spacing mapping of AB-BLG and 30°-tBLG.
Figure 4B:
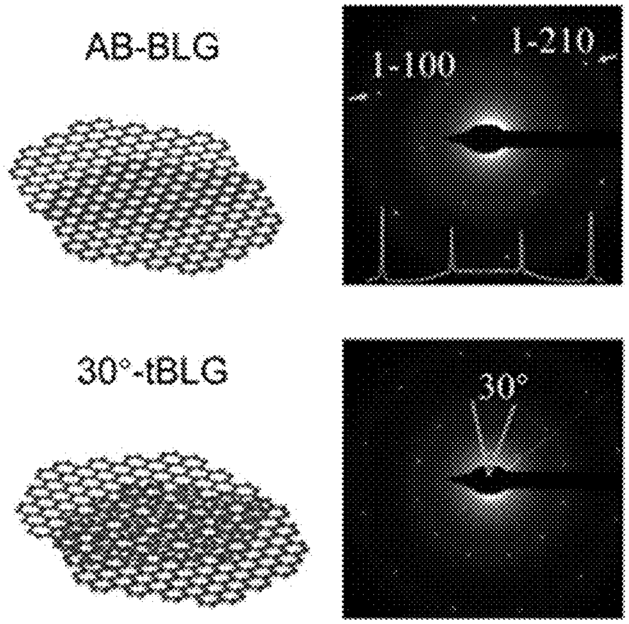
Figure 4C:
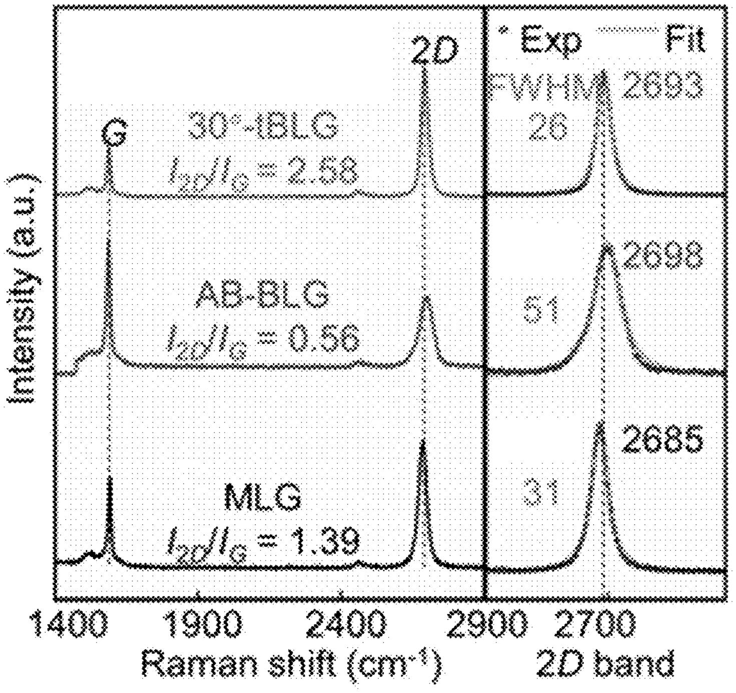
Figure 4D:
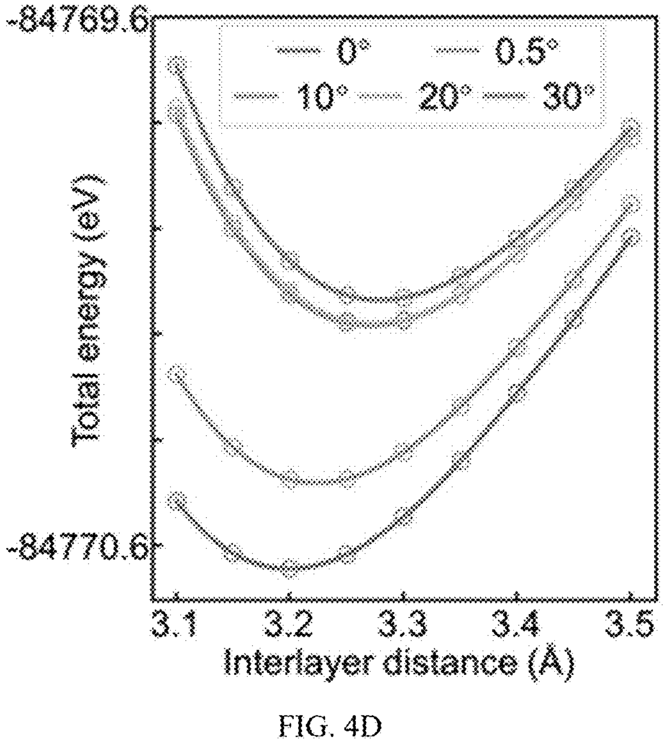
Figure 4E:
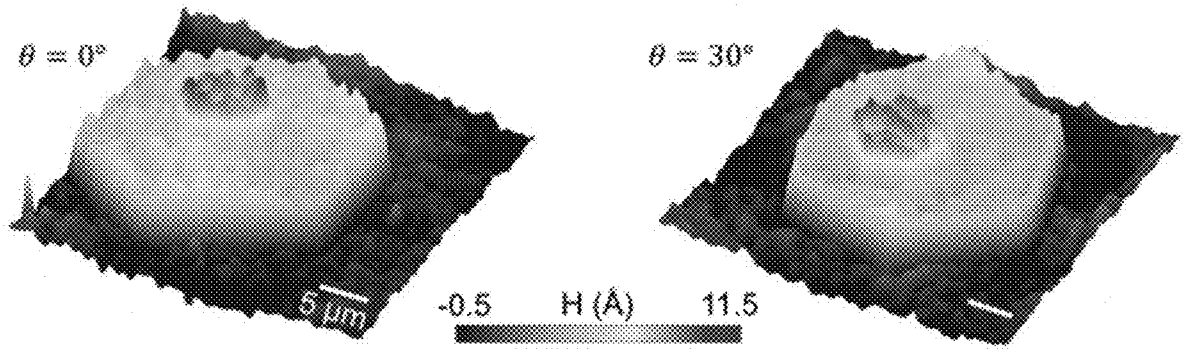
Figure 4F:
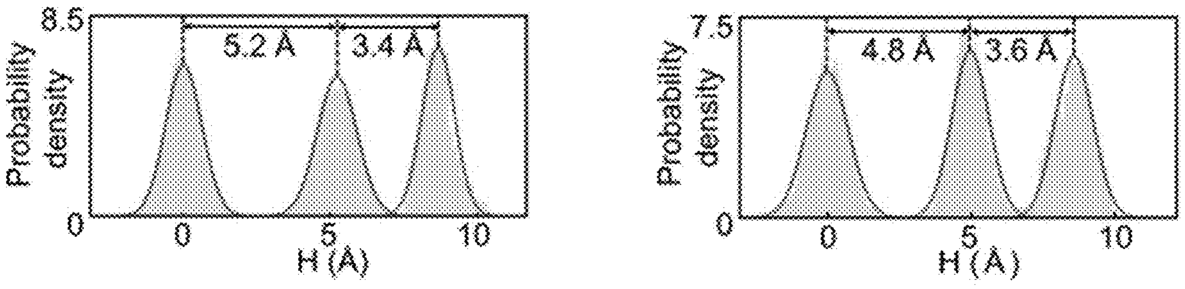
Figure 4G:
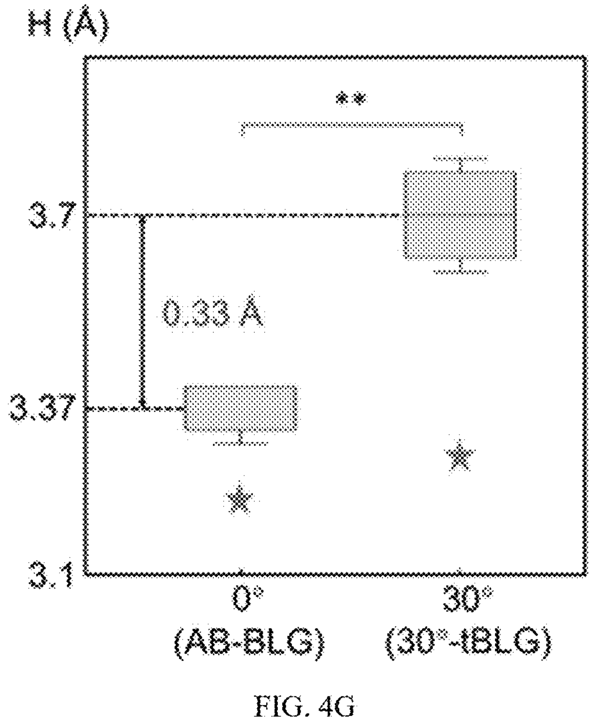

FIGS. 4A-4G illustrate the interlayer spacing mapping of AB-BLG and 30°-tBLG. In particular, FIG. 4A shows the synthesis and transfer processes of BLG samples. FIG. 4B demonstrates stacking orders of AB-BLG and 30°-tBLG, and corresponding SAED patterns. FIG. 4C shows Raman spectra and Lorentz fitting of the 2D bands of MLG, AB-BLG, and 30°-tBLG, respectively. FIG. 4D provides DFT calculations results for BLG with different twisting angles. FIG. 4E shows retrieved geometrical thickness maps from Phi-AMP of AB-BLG and 30°-tBLG, respectively, FIG. 4F shows histograms of the geometrical thickness maps of AB-BLG and 30°-tBLG in FIG. 4E, respectively. FIG. 4G shows an independent-samples t-test demonstrating a 0.33 Å interlayer spacing difference between bilayer graphene samples with different $\theta$ ($P<0.01$), wherein the results are comparable with DFT calculations as labeled with stars.

Figure 5C:
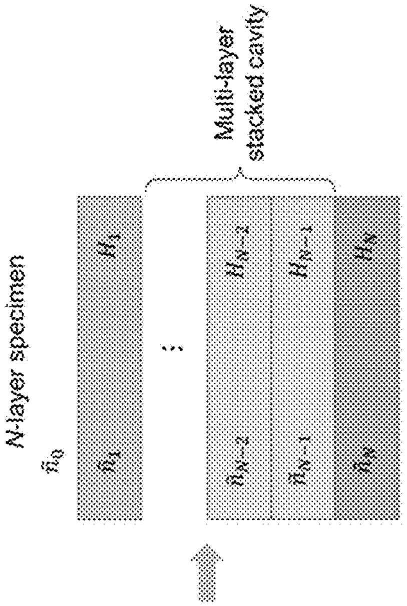
Figure 5B:
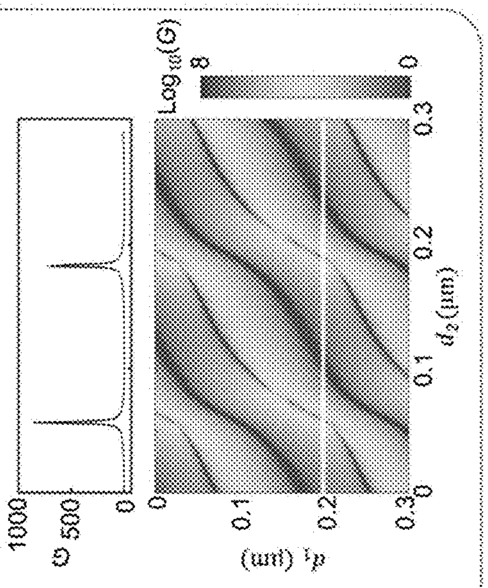
Figure 5A:
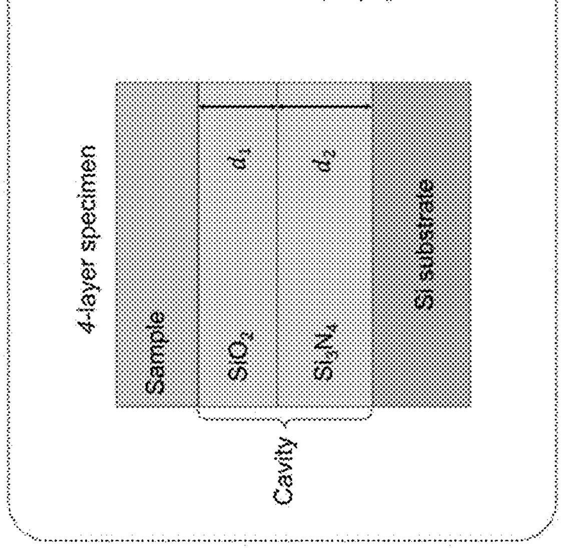

FIGS. 5A and 5B illustrate the generalization of the phase gain mechanism by optimizing the cavity design, such as a $Si_3N_4/SiO_2$ cavity. In particular, FIG. 5A shows a schematic representation of a 4-layer specimen with a two-layer cavity. FIG. 5B shows simulation results of the relationship between phase gain G and cavity lengths of two layers $d_1$ and $d_2$ at 532 nm wavelength, wherein the relation between G and $d_2$ at $d_1=0.2$ μm is plotted, the phase gain may reach around 1000. The simulation results demonstrate the possibility of higher phase amplification with a multi-layer cavity design as shown in FIG. 5C

Materials and Methods

Using the phase gain theoretical model, the optimized phase cavity can be designed by selecting the appropriate cavity materials, cavity length, and illumination wavelength to achieve maximum phase amplification for the sample of interest.

The silicon substrate with the designed cavity is fabricated, and the targeted sample is transferred on it. The specimen is then imaged using an epi-mode high-sensitivity interferometric imaging system to quantitatively retrieve the phase map. Subsequently, the geometric thickness map can be reconstructed using the thickness reversal model.

Example 1

In one embodiment, the monolayer graphene film is first synthesized using chemical vapor deposition (CVD). The optimal cavity length for maximum phase amplification is selected. The fabricated monolayer graphene film is transferred to the $Si/SiO_2$ substrate. Then, the designed patterns are created on the graphene sample using e-beam lithography (EBL). The phase maps of two graphene samples can be obtained using the epi-mode high-sensitivity interferometric imaging system. The geometric thickness maps of two graphene samples are retrieved by the thickness reversal model. The imaging result of a line pair with pitch 750 nm shows the lateral resolving power of the imaging system. The comparison of morphological characterization of a CUHK pattern between AFM and the method of the subject invention shows the capability of accurately profiling of single atomic layer by the method of the subject invention.

Example 2

In another embodiment, the bilayer graphene samples are synthesized using chemical vapor deposition (CVD) and then transferred to the $Si/SiO_2$ substrate for further imaging. The optimal cavity length for maximum phase amplification is selected. The stacking orders and the exact stacking angles of bilayer graphene samples are characterized by combining selected area electron diffraction (SAED) and Raman microscopy. For consistency, the identical sample characterized by Raman microscopy for subsequent morphological measurements are selected. The phase maps of two graphene samples with different stacking orders can be obtained using the epi-mode high-sensitivity interferometric imaging system. The geometric thickness maps of two graphene samples can be retrieved by the thickness reversal model. The results demonstrate that the method of the subject invention can distinguish two samples with ~0.3 Å interlayer spacing difference.

Embodiment 1. A microscopic imaging method with sub-Ångström level measurement accuracy, comprising: coupling a phase cavity with an interferometric imaging system to effectively amplify phase signals of a sample of interest; modeling resonance effects in the phase cavity; and optimizing parameters of the phase cavity to maximize amplification of phase signals of the sample of interest, while suppressing noises.

Embodiment 2. The method of embodiment 1, wherein the phase cavity is disposed on a sample side of the interferometric imaging system.

Embodiment 3. The method of embodiment 1, wherein the phase cavity is formed by two substrates.

Embodiment 4. The method of embodiment 3, wherein each substrate of the phase cavity is formed of a uniformly fabricated transparent film.

Embodiment 5. The method of embodiment 1, wherein the optimizing parameters of the phase cavity comprises optimizing a material of the phase cavity, the length of the phase cavity, or illumination wavelength.

Embodiment 6. The method of embodiment 1, wherein the optimizing parameters of the phase cavity comprises defining a phase gain G-factor as an evaluation parameter of phase amplification.

Embodiment 7. The method of embodiment 1, further comprises obtaining phase maps by the interferometric imaging systems based on laser illumination.

Embodiment 8. The method of embodiment 7, further comprising performing a transfer-matrix-based reversal model to simulate light propagation in the interferometric imaging system and reconstructing thickness mapping results from the measured phase maps.

Embodiment 9. The method of embodiment 7, further comprising increasing spatial resolutions of the interferometric imaging system by providing synthetic aperture illumination.

Embodiment 10. The method of embodiment 7, further comprising increasing spatial resolutions of the interferometric imaging system by providing angle-scanning illumination.

Embodiment 11. The method of embodiment 7, further comprising increasing spatial resolutions of the interferometric imaging system by providing short wavelength illumination.

Embodiment 12. The method of embodiment 11, wherein the short wavelength is the extreme ultraviolet wavelength.

Embodiment 13. The method of embodiment 1, wherein the phase cavity is formed of silicon dioxide ($SiO_2$).

Embodiment 14. The method of embodiment 1, wherein the phase cavity is formed of silicon nitride ($Si_3N_4$).

Embodiment 15. The method of embodiment 1, wherein the phase cavity is formed by stacking a silicon dioxide ($SiO_2$) material and a silicon nitride ($Si_3N_4$) material.

Embodiment 16. The method of embodiment 1, wherein a measurement accuracy of 0.1 Å is achieved for the interferometric imaging system.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

ADDIN EN.REFLIST 1. Li, Y. X. et al. Tuning commensurability in twisted van der Waals bilayers. *Nature* 625 (2024).
2. Cao, Y. et al. Unconventional superconductivity in magic-angle graphene superlattices. *Nature* 556, 43-+(2018).
3. Dai, Z. W. et al. Quantum-Well Bound States in Graphene Heterostructure Interfaces. *Phys Rev Lett* 127 (2021).
4. Liu, C. et al. Two-dimensional materials for next-generation computing technologies. *Nat Nanotechnol* 15, 545-557 (2020).
5. Zeng, S., Liu, C. & Zhou, P. Transistor engineering based on 2D materials in the post-silicon era. *Nature Reviews Electrical Engineering* (2024).
6. Liu, Y. et al. Promises and prospects of two-dimensional transistors. *Nature* 591, 43-53 (2021).
7. Wang, S. et al. Two-dimensional devices and integration towards the silicon lines. *Nat Mater* 21, 1225-1239 (2022).
8. Novoselov, K. S., Mishchenko, A., Carvalho, A. & Neto, A. H. C. 2D materials and van der Waals heterostructures. *Science* 353 (2016).
9. Liu, Y. et al. Van der Waals heterostructures and devices. *Nat Rev Mater* 1 (2016).
10. Zhou, Z. J. et al. Stack growth of wafer-scale van der Waals superconductor heterostructures. *Nature* 621, 499-+ (2023).
11. Jorio, A. Twistronics and the small-angle magic. *Nat Mater* 21, 844-845 (2022).
12. Orji, N. G. et al. Metrology for the next generation of semiconductor devices. *Nat Electron* 1, 532-547 (2018).
13. Dai, D. J. et al. Twist angle-dependent valley polarization switching in heterostructures. *Sci Adv* 10 (2024).
14. Potocnik, T. et al. Fast Twist Angle Mapping of Bilayer Graphene Using Spectroscopic Ellipsometric Contrast Microscopy. *Nano Lett* 23, 5506-5513 (2023).
15. Abbott, B. P. et al. Observation of Gravitational Waves from a Binary Black Hole Merger. *Phys Rev Lett* 116 (2016).
16. Agostini, P., Krausz, F. & L'Huillier, A. Light as fast as electrons. *Nat Phys* 19, 1520-1520 (2023).
17. Zernike, F. Phase contrast, a new method for the microscopic observation of transparent objects part II. *Physica* 9, 974-986 (1942).
18. Zernike, F. Phase contrast, a new method for the microscopic observation of transparent objects. *Physica* 9, 686-698 (1942).
19. Bhaduri, B. et al. Diffraction phase microscopy: principles and applications in materials and life sciences. *Adv Opt Photonics* 6, 57-119 (2014).
20. Park, Y., Depeursinge, C. & Popescu, G. Quantitative phase imaging in biomedicine. *Nat Photonics* 12, 578-589 (2018).
21. Lee, C., Baek, Y., Hugonnet, H. & Park, Y. Single-shot wide-field topography measurement using spectrally multiplexed reflection intensity holography via space-domain Kramers-Kronig relations. *Opt Lett* 47, 1025-1028 (2022).
22. Edwards, C., Arbabi, A., Popescu, G. & Goddard, L. L. Optically monitoring and controlling nanoscale topography during semiconductor etching (vol 1, e30, 2012). *Light-Sci Appl* 1 (2012).
23. Kandel, M. E. et al. Epi-illumination gradient light interference microscopy for imaging opaque structures. *Nat Commun* 10 (2019).
24. Nie, Y. J. et al. Transmission-Matrix Quantitative Phase Profilometry for Accurate and Fast Thickness Mapping of 2D Materials. *Acs Photonics* 10, 1084-1092 (2023).
25. Ling, T. et al. High-speed interferometric imaging reveals dynamics of neuronal deformation during the action potential. *P Natl Acad Sci USA* 117, 10278-10285 (2020).
26. Thiele, J. C., Pfitzner, E. & Kukura, P. Single-protein optical holography. *Nat Photonics* 18 (2024).
27. Shin, S., Kim, K., Lee, K., Lee, S. & Park, Y. Effects of spatiotemporal coherence on interferometric microscopy. *Opt Express* 25, 8085-8097 (2017).
28. Zheng, C. et al. High spatial and temporal resolution synthetic aperture phase microscopy. *Adv Photonics* 2 (2020).
29. Chen, X., Kandel, M. E. & Popescu, G. Spatial light interference microscopy: principle and applications to biomedicine. *Adv Opt Photonics* 13, 353-425 (2021).

We claim:

1. A microscopic imaging method with sub-Ångström level measurement accuracy, comprising:

disposing a phase cavity on a sample side of an interferometric imaging system;

coupling the phase cavity with the interferometric imaging system to effectively amplify phase signals of a sample of interest;

modeling resonance effects in the phase cavity;

optimizing parameters of the phase cavity to maximize the amplification of phase signals of the sample of interest, while suppressing noise; and performing a transfer-matrix-based reversal method to simulate light propagation in the interferometric imaging system and reconstructing thickness mapping results from the measured phase maps.

2. The method of claim 1, wherein the phase cavity is formed by two cavity ends.

3. The method of claim 2, wherein the cavity body between two cavity ends is formed of a uniformly fabricated transparent film.

4. The method of claim 1, wherein the optimizing parameters of the phase cavity comprises optimizing a material of the phase cavity, the length of the phase cavity, or illumination wavelength.

5. The method of claim 1, wherein the optimizing parameters of the phase cavity comprises defining a phase gain G-factor as an evaluation parameter of phase amplification.

6. The method of claim 1, further comprising obtaining phase maps by the interferometric imaging systems based on laser illumination.

7. The method of claim 6, further comprising increasing spatial resolution of the interferometric imaging system by providing synthetic aperture illumination.

8. The method of claim 6, further comprising increasing spatial resolution of the interferometric imaging system by providing angle-scanning illumination.

9. The method of claim 6, further comprising increasing spatial resolution of the interferometric imaging system by providing short wavelength illumination.

10. The method of claim 9, wherein the short wavelength is the extreme ultraviolet wavelength.

11. The method of claim 1, wherein the phase cavity is formed of silicon dioxide ($SiO_2$).

12. The method of claim 1, wherein the phase cavity is formed of silicon nitride ($Si_3N_4$).

13. The method of claim 1, wherein the phase cavity is formed by stacking a silicon dioxide ($SiO_2$) material and a silicon nitride ($Si_3N_4$) material.

14. The method of claim 1, wherein a measurement accuracy of 0.1 Å is achieved for the interferometric imaging system.

* * * * *